United States Patent [19]

Murata et al.

[11] Patent Number: 4,536,428
[45] Date of Patent: Aug. 20, 1985

[54] MAGNETIC DISPLAY PANEL

[75] Inventors: Yasuzo Murata; Hiroshi Sato, both of Kanagawa, Japan

[73] Assignee: Pilot Man-Nen-Hitsu Kabushiki Kaisha, Tokyo, Japan

[21] Appl. No.: 160,700

[22] Filed: Jun. 18, 1980

[30] Foreign Application Priority Data

Jun. 20, 1979 [JP] Japan ............................ 54-77646

[51] Int. Cl.$^3$ .............................................. B43L 1/12
[52] U.S. Cl. ................................ 428/117; 40/449; 346/21; 346/135.1; 428/119; 428/692; 428/900; 434/152; 434/259; 434/409; 434/432
[58] Field of Search ............... 428/900, 692, 119, 117; 346/21, 135.1; 35/66; 434/409, 259, 432, 152; 40/449

[56] References Cited

U.S. PATENT DOCUMENTS 3,938,263  2/1976  Tate ..................... 428/900
3,982,334  9/1976  Tate ..................... 434/409
4,143,472  3/1979  Murata et al. ............ 35/66

FOREIGN PATENT DOCUMENTS 2034640  6/1980  United Kingdom ........... 434/409

OTHER PUBLICATIONS

Lubs, *The Chemistry of Synthetic Dyes and Pigments*, Hafner Publishing Co., New York, (1965), pp. 635–636.

*Primary Examiner*—Ellis P. Robinson
*Attorney, Agent, or Firm*—Sughrue, Mion, Zinn, Macpeak & Seas

[57] ABSTRACT

A magnetic display panel having a transparent or translucent front substrate and a rear substrate bonded thereto by an adhesive with a dispersing liquid confining space formed between the substrates, preferably in the form of multiple cells. The dispersing liquid, composed of a fine particulate thickener, fine magnetic particles, a colorant and a dispersing medium, has a yield value of at least 5 dyne/cm$^2$. A clear, long-lasting image is recordable by tracing a permanent magnet upon the face of the first substrate.

35 Claims, 12 Drawing Figures

MAGNETIC DISPLAY PANEL

BACKGROUND OF THE INVENTION

1. Field of the Invention

The present invention relates to a magnetic display panel that uses magnetic force to form a clear record display and to erase the display.

2. Description of the Prior Art

A conventional technique of forming a display using magnetic force uses the application of a magnetic field to a dispersion system having fine magnetic particles dispersed in a colored liquid dispersion medium to cause the fine particles to migrate and change the color of the dispersion system. According to this technique, a magnetic field is applied with a magnetic pen to a dispersion system composed of a dispersion medium colored with a dye or pigment in which is dispersed fine magnetizable particles of a color different from that of the dispersion medium. The degree by which the migrating particles are shielded by the dispersion medium is varied to change the color of the dispersion system.

This technique unfortunately suffers from the following defects. With the dispersion system sealed between two opposing substrates, when a magnetic pen is moved over the surface of one substrate to apply a magnetic field to the dispersion system, the magnetizable fine particles are attracted to scanned area of that substrate to form a letter or pattern that follows the locus of the pen. However, ones of the attracted particles having a specific gravity much greater than that of the dispersion medium precipitate away from the display surface with the lapse of time making it impossible to retain the letter or pattern over an extended period of time. Another defect lies in the fact that all magnetic particles within the influence of the magnetic field of the magnetic pen are attracted to the pen and hence even particles quite remote in distance from the pen are attracted thereby forming a greatly blurred display of letter or pattern.

If the precipitation of magnetic fine particles is prevented by using micro-fine particles or by coating the particles with a sufficient amount of a resin of low specific gravity to bring the apparent specific gravity of the particles close to that of the dispersion medium, the magnetic force acting on the magnetic particles is decreased to such a level that they become less attractable by the magnetic pen and fail to form a letter or pattern of high contrast and tone. In addition, letters or patterns formed with such particles are difficult to erase, because the particles are not easily attracted to the rear substrate even if a relatively strong magnetic field is applied to that substrate. After repeated recording and erasure operations, the fine magnetic particles tend to remain suspended in the dispersion system thereby darkening the system. This also makes the desired display and erasure characteristics unobtainable.

For the reasons set forth, no magnetic display panel had been commercially produced before the present inventors developed the display panel disclosed in U.S. Pat. No. 4,143,472 issued on Mar. 13, 1979. The magnetic display panel therein disclosed has two substrates between which are confined a dispersing liquid having a yield value of 5 dyne/cm$^2$ or more and which is composed of fine magnetic particles, a colorant, a dispersion medium and a fine particulate thickener.

As described above, a magnetic display panel using a dispersion system having fine magnetic particles dispersed in a colored liquid dispersion medium has serious defects. The concept of that invention is based on our finding that a magnetic display panel using a plastic dispersing liquid having a yield value of 5 dyne/cm$^2$ or more prepared by incorporating a fine particulate thickener in a dispersing liquid having fine magnetic particles dispersed in a dispersion medium provides a sharp display of high contrast. The display remains stable over an extended period of time and can be erased completely whenever necessary.

To maintain fine magnetic particles of high specific gravity in given positions in a liquid dispersion and to move the particles all at once upon application of a magnetic field, neither the control of the viscosity of the liquid dispersion nor the use of a dispersion stabilizer or protective colloid nor making the specific gravity of the dispersion medium equal to that of the magnetic particles is sufficient. The desired result can only be obtained with a dispersing liquid having a certain critical range of yield value. Our continued studies have revealed that such a result is obtainable with a dispersing liquid the yield value of which is controlled to be not less than 5 dyne/cm$^2$ using a fine particulate thickener. If the yield value of the dispersing liquid is less than 5 dyne/cm$^2$, not only is an indistinct display produced but also the fine magnetic particles rapidly precipitate after the display is formed. As a result, the displayed patterns may be indistinct or entirely illegible, and moreover will fade out with time. Such a drawback is most conspicuous when a dispersing liquid having a yield value of 0 dyne/cm$^2$, that is, when no fine particulate thickener is used. The problem is reduced as the yield value is increased by the addition of a fine particulate thickener. Only when the dispersing liquid has a yield value of 5 dyne/cm$^2$ or more is a magnetic display panel free from the defects mentioned above obtained. Therefore, it is critical to the invention of U.S. Pat. No. 4,143,472 that the dispersing liquid used have a yield value of 5 dyne/cm$^2$ or higher.

The term "yield value" as used in that patent and herein means the lowest stress required to cause a liquid to flow. This is indicated by the stress at point A in the flow curve shown in FIG. 1.

SUMMARY OF THE INVENTION

With a view of overcoming the drawbacks enumerated above, the present invention relates to a magnetic display panel including a liquid containing panel having a front substrate which is transparent or at least translucent and arranged opposite a rear substrate and bonded thereto by an adhesive agent to make a liquid sealing space between said two substrates. A dispersing liquid having a yield value of 5 dyne/cm$^2$ or more is sealed in this space. The dispersing liquid is composed of a fine particulate thickener selected from the group consisting of an olefinic polymer, olefinic copolymer, metal soap, fatty acid amide, wax and dextrin fatty acid ester, fine magnetic particles, a colorant and a dispersion medium. Display of an image or pattern is effected with a movable marking device which produces an oriented magnetic field.

BRIEF DESCRIPTION OF THE DRAWINGS

The objects and advantages of this invention will be apparent upon consideration of the following detailed description in conjunction with the accompanying drawings in which.

DESCRIPTION OF THE PREFERRED EMBODIMENTS

Figure 1:
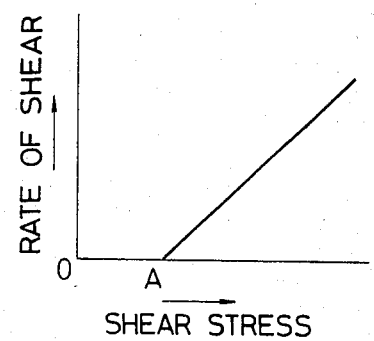
FIG. 1 is a graphical representation of the relationship between the rate of shear and shear stress for describing the yield value of a dispersing liquid used in a magnetic display panel of the invention.

To form a display panel for use with the invention, a front substrate must be bonded to a rear substrate or, alternatively, a multicell plate placed between the front and rear substrates must be bonded to the front substrate and/or the rear substrate. During the fabrication of such a display panel, various foreign matter very often enters the liquid dispersion. Typical of such foreign matter is an adhesive which can dissolve in the liquid dispersion and cause a change in its yield value. Other sources of foreign matter are the front and rear substrates, a multicell plate, deposits on such objects, and dust and dirt present at the fabrication site. Preventing the entrance of such foreign matter has proven to be very difficult. Such foreign materials are the cause of a lowering of the yield value of the dispersing liquid. If such matter is present, a dispersing liquid, although it may have a present yield value of 5 dyne/cm$^2$ or more, can no longer retain that level after it is confined in a panel thereby rendering the resulting panel inoperative.

As a result of various efforts to locate the cause of the decrease in the yield value of the dispersing liquid in a panel to below 5 dyne/cm$^2$ and to provide a device or method for preventing such a decrease, we have found that a selected organic thickener has the effect of preventing the decrease in the yield value of the liquid dispersion that accompanies the entrance of foreign matter in the dispersion during the fabrication of a display panel.

The use of a selected organic thickener prevents variation in the yield value presumably because it is less susceptible to the presence of an adhesive agent or other foreign matter dissolved in the liquid dispersion. The organic thickener used in this invention provides the same intended result no matter how many times a display record is formed and erased.

Examples of the organic thickener to be used for the intended purpose are an olefinic polymer olefinic copolymer, polyalkylstyrene, wax, metal soap, fatty acid amide, dextrin fatty acid ester, hydroxypropyl cellulose ester, sucrose fatty acid ester, acylamino acid ester, starch fatty acid ester, and dibenzylidene sorbitol. Illustrative olefinic polymers include polyethylene, low molecular weight polyethylene, polypropylene and low molecular weight propylene. Illustrative olefinic copolymers include ethylene-vinyl acetate copolymer, ethylene-ethyl acrylate copolymer and ethylene-unsaturated organic acid copolymer. These thickeners may be used independently or as a mixture in this invention. The amount used may be varied according to the type of dispersion medium and thickener employed. However, with respect to the dispersion medium it is possible to provide a liquid dispersion medium with a yield value of 5 dyne/cm$^2$ by adding 0.3 weight percent thereof.

Examples of suitable fine magnetic particles which can be used in this invention include magnetic oxide materials such as black magnetite, gamma-hematite, chromium dioxide and ferrite as well as magnetic metal materials made of alloys based on, for example, iron, cobalt or nickel, and granulated forms of these materials. If necessary, these fine particles may be adjusted for their color tone. The optimum size of the magnetic particles is 10 microns or more although particles having a size of less than 10 microns are also applicable. Such smaller particles provide an advantageous result if they agglomerate in a dispersion liquid to give an apparent diameter of 10 microns or more.

Granulation of fine magnetic particles to such an extent that they will form agglomerates having an apparent size in a specified range by blending them with a resin solution followed by either drying and grinding or spraying and drying is preferred because grinding provides an increased motility of the particles upon application of a magnetic field and provides a sharper display. The solid content of the resin used in such granulation should not exceed 40 wt% of the amount of the fine magnetic particles and preferably should not exceed 30 wt% of the amount of the fine magnetic particles. The granulated fine magnetic particles are also referred to as fine magnetic particles herein.

The dispersion medium used may be a polar type such as water or a glycol or a non-polar type such as organic solvents or oils. Paraffinic solvents have been found to provide particularly good results.

The space between the two substrates which enclose the dispersion may be varied according to the specific application to which the display panel is put. However, for providing a sharp display with high contrast and for providing good erasure capability, the substrates may be spaced by a distance of from 0.5 to 20 mm, preferably from 0.5 to 2.0 mm. The amount of the fine magnetic particles in the dispersion liquid is preferably 15 parts or more per 100 parts of the dispersion medium. A smaller amount is not sufficient for magnetic particles to cover every part of the locus of a magnetic pen when they are attracted to either substrate over which the pen is moved to draw a letter or pattern resulting in a very poor display having discontinuous, broken lines.

The front substrate from which the display is read is preferably made of a transparent material but, depending on the particular application, it may be made of a translucent material. In either case, a variety of different plastics and glass can be employed. The other or rear substrate need not necessarily be made of a transparent material and hence a wide variety of plastics, glass and metals can be used. These plastics and glass may or may not be colored as desired. The advantages of colored plastics or glass are that a high contrast is produced between the substrate and magnetic particles and, secondly, a sharp display is produced even if light is shone on the rear side.

The substrates are bonded to each other by an adhesive agent selected from an epoxy adhesive, polyurethane adhesive, vinyl adhesive, polyester adhesive, acrylic adhesive and synthetic rubber adhesive.

Color is used to provide the liquid dispersion with shielding properties and a color tone to increase the contrast between the color of the display formed by the fine magnetic particles and the background. Suitable colorants are white pigments and other pigments and dyes. A white pigment is most effective for providing a high contrast although pigments or dyes of any desired color may be employed. The use of less than 10%, preferably less than 3%, of the colorant on the basis of the liquid dispersion yields a sufficient increase in contrast between the dispersion and the fine magnetic particles to form a sharp display. If too much colorant is used, the display formed by the fine magnetic particles becomes less distinct. No colorant need be added if the organic thickener has reasonable shielding properties as well as a color tone having a high contrast with the fine magnetic particles.

The arrangement of multiple independent small cells between two substrates provides a uniform distribution of magnetic particles in the liquid dispersion between the substrate. Magnetic particles having a greater specific gravity than the dispersion medium have a tendency to be congregate locally in the dispersion. This tendency may be increased in a magnetic display panel of the invention to thereby form a less distinct display because a magnet is used to perform the display and erase operations. To avoid this difficulty, multiple independent cells can be provided between the substrates by placing a multicell plate having a plurality of through holes between the two substrates or by providing one of the substrates with cavities and bonding it tightly to the other substrate. The liquid dispersion confined in one cell will not migrate into an adjacent cell thereby eliminating the effects of uneven distribution of magnetic particles within the dispersion. Moreover, the multicell structure provides a higher contrast and the multicell plate keeps the front substrate spaced by a constant distance from the rear substrate. The cross section of each cell may be circular or polygonal. The thinner the wall that separates one cell from another, the better the continuity of the display that is obtained. The partition wall preferably has a thickness of less than 0.5 mm. To completely prevent leakage of the liquid dispersion, the edges of the two substrates are bonded to each other.

The marking tool used with the invention display panel is a movable marking device having an oriented magnetic field composed either of a permanent magnet or an electromagnet. Such a marking tool is used to perform both display and erase functions since both functions are performed by moving the fine particles with a magnetic field.

Figure 2:
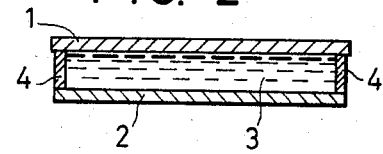
FIGS. 2 to 7 are sectional views illustrating various embodiments of the magnetic display panel of the invention.
Figure 3:
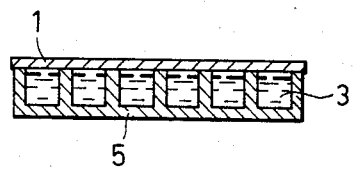
Figure 4:
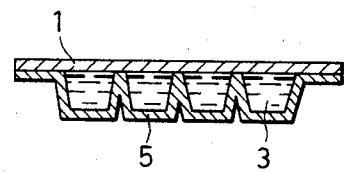
Figure 5:
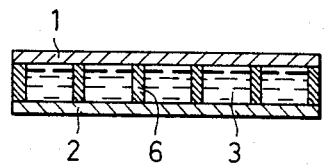
Figure 6:
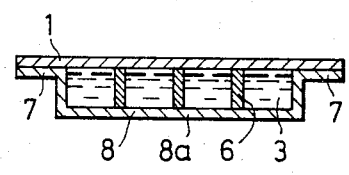

Referring to FIG. 2, a magnetic display panel is shown which includes a transparent front substrate 1 and a rear substrate 2 having confined therein a dispersing liquid 3 as described above by an adhesive 4 applied to the marginal edges of the two substrates. FIG. 3 shows a magnetic display panel which uses a multicell plate 5 having a substrate integrally formed with partition walls to form independent cells. After the dispersing liquid 3 is placed in the individual cells, the multicell plate 5 is bonded to a substrate 1. In this magnetic panel, the substrate 1 may be used either as the front or rear substrate. FIG. 4 shows a magnetic display panel utilizing a substrate 5 having cavities formed therein. After the dispersing liquid 3 is placed in each cavity, the substrate 5 is bonded to a substrate 1 by an adhesive. FIG. 5 shows a magnetic display panel constructed with a multicell plate 6 having a number of independent cells in the form of through holes and which is bonded to a rear substrate 2. After the dispersing liquid 3 is placed in each cell, a front substrate 1 is bonded to the multicell plate 6. FIG. 6 shows another type of magnetic display panel which uses a cup-shaped substrate 8 having a marginal portion 7 around its periphery and a recess 8a in the center. A multicell plate 6 of the same construction as shown in FIG. 5 is placed in the recess and the dispersing liquid 3 is put in the cells of the plate 6. Thereafter, a substrate 1 is dispersed in the open mouth of the substrate 8 and the marginal portion 7 and is bonded to the substrate 1 by an adhesive. In this magnetic panel, the substrate 1 may be used either as the front or rear substrate. In the embodiment shown in FIG. 7, an intermediate substrate 9 is placed between a front substrate 1 and a rear substrate 2 and multicell plates 6 of the same construction as used in FIG. 5 are placed between the front substrate 1 and the intermediate substrate 9 and between the rear substrate 2 and the intermediate substrate 9. After the dispersing liquid 3 is put in the cells of the multicell plate 6, the front substrate, intermediate substrate and the multicell plate are bonded together with an adhesive and the intermediate substrate, rear substrate and the multicell plate also bonded together with an adhesive. In the magnetic display panel shown in FIG. 7, the front substrate 2 can also be used as a front substrate. The intermediate substrate 9 may be made of either a transparent or opaque material.

Figure 7:
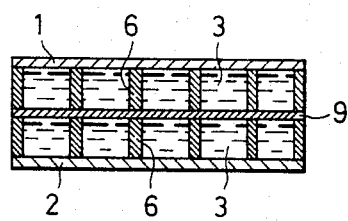
Figure 8:
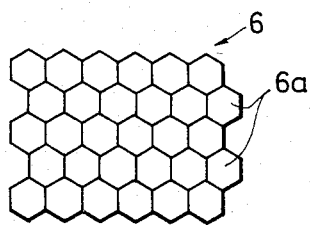
FIGS. 8 to 12 are partial plan views illustrating multicell structures for use in the magnetic display panel of the invention.
Figure 9:
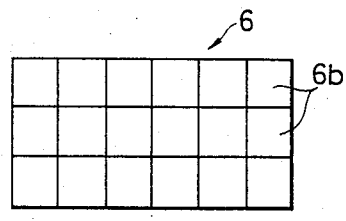
Figure 10:
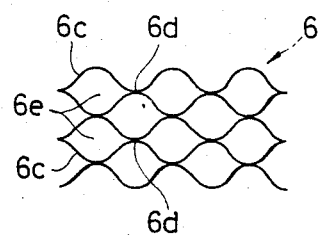
Figure 11:
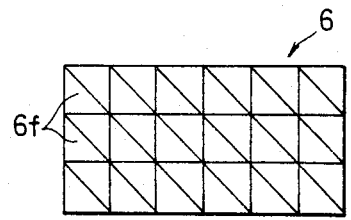
Figure 12:
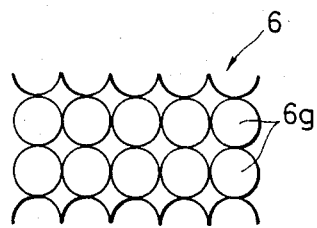

The multicell plate 6 shown in FIGS. 5 to 7 may be constituted of honeycomb cells 6a as shown in FIG. 8 or cells having a rectangular cross section as shown in FIG. 9. Alternatively, as shown in FIG. 10, corrugated plates 6c may be piled one on another in such a manner that the protruding portions 6d of an adjacent corrugated plate 6c thereby form cells 6e having a spindle-shaped cross section. The multicell plate 6 can also be constituted by cells 6f having a triangular cross section as shown in FIG. 11 or cells 6g having a circular cross section as shown in FIG. 12. It is to be understood that the cells shown in FIGS. 3 and 4 may be replaced by any of the cells shown in FIGS. 8 to 12.

With the magnetic display panel thus formed, to erase a display an erasure permanent magnet or an erasure electromagnet through which a current is passed is moved over the surface of the rear substrate to impose upon the dispersing liquid a magnetic field that causes the magnetic particles in the liquid to be attracted to the rear side. After the erasure operation, a magnetic pen equipped with a permanent magnet may be moved on the front substrate or a magnetic stamp brought into contact with the substrate whereupon the magnetic particles in the dispersing liquid that have been attracted to the rear side are selectively attracted to the front side in accordance with the locus of the magnetic pen or stamp to produce a contrast in the dispersing liquid and to thereby produce the desired display.

Repeating the above procedures, display and erasure of a recorded image on the magnetic display panel can be effected as many times as one likes. Examples of other applicable methods or devices are to effect recording by applying a current through a pen-shaped electromagnet instead of a pen-shaped permanent magnet, a method with which recording is effected by applying a current through a magnetic head, a printing device that uses a permanently magnetized plate having patterns such as geometrical figures or letters of such a plate magnetized by an electromagnet, a pen-shaped magnet that is modelled after a Japanese writing brush formed as an assembly of hairs of magnetic material, and a recording device that combines a magnetic pattern made of a material which possesses a magnetic shielding effect with a permanent magnet or an electromagnet.

A displaying magnetic panel may be fabricated by confining a liquid dispersion of the fine magnetic particles in cells arranged to provide picture elements, for example, a seven segment alpha-numeric display, cells arranged from a dot matrix, or cells arranged in character or geometrical patterns.

To erase the display on the magnetic panel, a permanent erasure magnet or an erasure electromagnet through which a current is passed is moved over the surface of the front substrate to attract the magnetic particles to the front side in a desired image pattern. Afterwards, a recording head on the rear substrate provided as a permanent magnet or an electromagnet is operated to apply a magnetic field to the dispersing liquid to return some of the magnetic particles to the rear side thereby changing only the color of the picture elements. Repeating this procedure, display and erasure of a record on the magnetic panel can be effected as many times as one wishes.

The foregoing description assumes separate display and erase tools but it should be understood that the two functions can be performed by a single tool if desired.

The magnetic display panel of the invention is very useful since it has many applications such as toys for infants, teaching equipment, writing boards, various game boards, record display boards, memorandum boards, blackboards, whiteboards, POP boards, and the like. It can even be used for underwater record displaying boards since one advantage of the panel of this invention is that it is inherently waterproof and no liquid ink or water-soluble writing material is used.

Several examples of a magnetic display panel of this invention will be described below. However, it should be understood that the invention is not limited to such examples. In the examples, all specified parts are by weight.

EXAMPLE 1

A mixture of 97 parts of Isopar M (trademark for an isoparaffin solvent produced by Humble Oil & Refining Co.) and 3 parts of A-C Polyethylene 9 (trademark for a low molecular polyethylene material produced by Allied Chemical Corp.) was heated then cooled to form a liquid dispersion of fine particles of A-C Polyethylene 9. A mixture of 99 parts of the dispersion and one part of Tipaque CR-50 (trademark for a titanium oxide product produced by Ishihara Sangyo K.K.) was homogenized to give a white liquid dispersion.

Forty parts of Toda Color KN-320 (trademark for a magnetic material produced by Toda Kogyo K.K.) were blended with 25 parts of a 40% methy ethyl ketone solution of Epo-Tohto YD-017 (trademark for a solid epoxy resin produced by Toto Kasei K.K.) and the blend was dried, ground and classified to produce 30 parts of fine black magnetic grains of 100–325 mesh. The grains were dispersed in the previously prepared white dispersion to form a liquid dispersion. Measurement with a Brookfield viscometer by the direct method showed that the dispersion had a yield value of 14.4 dyne/cm$^2$.

A mutlicell plate 1.0 mm thick having cells formed as independent through holes with a square cross section of 4×4 mm was sandwiched between two plastic films each 0.1 mm thick and fixed with an adhesive. A previously prepared liquid dispersion was disposed in the cells to make a magnetic display panel. The adhesive was a mixture of Adeka Resin EP 4000 (trademark for an epoxy resin produced by Asahi Electro-Chemical Co., Ltd.) and Epomate B 002 (trademark for a curing agent produced by Ajinomoto Co., Ltd.).

EXAMPLES 2 TO 14

Magnetic display panels were fabricated in the same manner as in Example 1 except that the types of organic thickener, dispersion medium, colorant and adhesive and the amount of magnetic particles were varied as indicated in Table 1. The yield values of the liquid dispersions are also indicated in the Table.

TABLE 1

| Example No. | Organic thickener (parts) | Dispersion medium (parts) | Magnetic particles (parts) | Colorant (parts) | Yield value dyne/cm$^2$ | Adhesive |
|---|---|---|---|---|---|---|
| 2 | DPDJ9169 (4.5) | Isopar M (95.5) | Black magnetic particles (20) | Tipaque CR-50 (1) | 32.5 | Adeka Resin EP 4000 Epomate B002 |
| 3 | Hoechst Wax OP (4.0) | Isopar H (96.0) | Black magnetic particles (25) | Tipaque CR-50 (1) | 32.2 | Adeka Resin EP 4000 Epomate B002 |
| 4 | Fatty Acid Amide C (6.0) | Mineral spirit (94.0) | Black magnetic particles (30) | Tipaque CR-50 (1) | 8.4 | Adeka Resin EP 4000 Epomate B002 |
| 5 | Lithium stearate (0.5) | Isopar M (99.5) | Black magnetic particles (25) | Tipaque CR-50 (1) | 12.2 | Adeka Resin EP 4000 Epomate B002 |
| 6 | Rheopearl KE (6.0) | Isopar M (94.0) | Black magnetic particles (20) | Tipaque CR-50 (1) | 30.6 | Adeka Resin EP 4000 Epomate B002 |
| 7 | Gellol D (0.35) | Ethylene glycol (99.65) | Black magnetic particles (22) | Tipaque CR-50 (1) | 62.6 | Adeka Resin EP 4000 Epomate B002 |
| 8 | A-C Polyethylene 9 (3) | Isopar M (97) | Black magnetic particles (30) | Tipaque CR-50 (1) | 14.4 | Adeka Resin EP 4000 Anchor 1170 |
| 9 | DPDJ9169 (4.5) | Isopar M (95.5) | Black magnetic particles (20) | Tipaque CR-50 (1) | 32.5 | Adeka Resin EP 4000 Anchor 1170 |
| 10 | Hoechst wax OP (4.0) | Isopar H (96.0) | Black magnetic particles (25) | Tipaque CR-50 (1) | 32.2 | Adeka Resin EP 4000 Anchor 1170 |
| 11 | Fatty Acid Amide C (6.0) | Mineral spirit (94.0) | Black magnetic particles (30) | Tipaque CR-50 (1) | 8.4 | Adeka Resin EP 4000 Anchor 1170 |
| 12 | Lithium stearate (0.5) | Isopar M (99.5) | Black magnetic particles (25) | Tipaque CR-50 (1) | 12.2 | Adeka Resin EP 4000 Anchor 1170 |
| 13 | Rheopearl KE (6.0) | Isopar M (94.0) | Black magnetic particles (20) | Tipaque CR-50 (1) | 30.6 | Adeka Resin EP 4000 Anchor 1170 |
| 14 | Gellol D (0.35) | Ethylene | Black magnetic | Tipaque CR-50 (1) | 62.6 | Adeka Resin EP 4000 |

TABLE 1-continued

| Example No. | Organic thickener (parts) | Dispersion medium (parts) | Magnetic particles (parts) | Colorant (parts) | Yield value dyne/cm$^2$ | Adhesive |
|---|---|---|---|---|---|---|
| | | glycol (99.65) | particles (22) | (1) | | Anchor 1170 |

Abbreviations:
DPDJ9169: Ethylene-ethyl acrylate copolymer produced by Nippon Unicar Co., Ltd.
Black magnetic particles: Same as used in Example 1
Hoechst Wax OP: Partially saponified ester wax produced by Hoechst Japan Ltd.
Isopar H: Isoparaffin solvent produced by Humble Oil & Refining Co.
Fatty Acid Amide C: Fatty acid amide produced by Kao Soap Co., Ltd.
Rheopeal: Dextrin fatty acid ester produced by Kaihatsu Kagaku Co., Ltd.
Gellol D: Dibenzylidene-D-sorbitol produced by New Japan Chemical Co., Ltd.
Anchor 1170: Curing agent produced by Anchor Chemical, England.

EXAMPLE 15

A mixture of 98 parts of Isopar M and 2 parts of aluminum stearate was heated in solution and then cooled to form a liquid dispersion of fine particles of aluminum stearate. A mixture of 100 parts of the dispersion and 0.9 parts of Tipaque CR-50 was homogenized to produce a white liquid dispersion.

Forty parts of Toda Color KN-320 were blended with 25 parts of a 40% methyl ethyl ketone solution of Epo-Tohto YD-017 and the blend was dried, ground and classified to produce 20 parts of fine black magnetic particles of 100–325 mesh. The particles were dispersed in a previously prepared white dispersion to form a liquid dispersion. Measurement with a Brookfield viscometer by the direct method showed that the dispersion has a yield value of 27.7 dyne/cm$^2$.

A multicell plate 1.0 mm thick having cells formed on independent through holes with a square cross section of 4×4 mm was sandwiched between two plastic films each 0.1 mm thick and fixed with an adhesive. A previously prepared liquid dispersion was disposed in the cells. The adhesive used was a 7:3 mixture of Adeka Resin UP 302 (trademark for a urethane polymer produced by Asahi Electro-Chemical Co., Ltd.) and Adeka Resin CA-128 (trademark for a curing agent provided by Asahi Electro-Chemical Co., Ltd.).

EXAMPLES 16 TO 19

Magnetic display panels were fabricated in the same manner as in Example 15 except that the types of organic thickener, dispersion medium, colorant and adhesive were varied as indicated in Table 2 below. The yield values of the liquid dispersions are also indicated in the Table.

TABLE 2

| Example No. | Organic thickener (parts) | Dispersion medium (parts) | Magnetic particles (parts) | Colorant (parts) | Yield value dyne/cm$^2$ | Adhesive (parts) |
|---|---|---|---|---|---|---|
| 15 | Aluminum stearate (2) | Isopar M (98) | Black magnetic particles (20) | Tipaque CR-50 (0.9) | 27.7 | Adeka Resin UP302 Adeka Resin CA-128 |
| 16 | " | " | Black magnetic particles (20) | " | " | DENKA vinyl #1000A (25) |
| 17 | Hoechst Wax OP (2) | Isopar M (98) | Black magnetic particles (20) | Tipaque CR-50 (1) | 19.0 | Vilon 200 (20) Methyl ethyl ketone (80) |
| 18 | " | " | Black magnetic particles (20) | " | " | ARON S-623 |
| 19 | AC Polyethylene (2) | " | Black magnetic particles (20) | " | 23.8 | JSR PN30A (10) Methyl ethyl ketone (90) |

Notes:
ADEKA Resin UP302: Urethane polymer produced by Asahi Electro-Chemical Co., Ltd.
ADEKA Resin CA-128: Curing agent produced by Asahi Electro-Chemical Co., Ltd.
DENKA vinyl #1000A: vinyl chloride-vinyl acetate copolymer produced by Denki Kagaku Kogyo Co., Ltd.
Vilon 200: polyester resin produced by Toyobo Co., Ltd.
Aron S-623: Polyacrylic ester solution produced by Toagosei Chemical Co., Ltd.
JSR PN3OA: Acrylonitrile-butadiene rubber produced by Japan SyntheticRubber Co., Ltd.
The adhesives of Examples 16, 17 and 19 were in solution.

COMPARATIVE EXAMPLE

A mixture of 98 parts of Isopar M, 1.75 parts of Aerosil-200 (trademark for a silicic acid powder produced by Degussa, Inc.) and one part of Tipaque CR-50 was kneaded with a T.K. homomixer (a wet type dispersing machine manufactured by Tokushukika Kogyo K.K.) until a white liquid was obtained.

Forty parts of Toda Color KN-320 were blended with 25 parts of a 40% methyl ethyl ketone solution of Epo-Tohto YD-017 and the blend was dried, ground and classified to produce 30 parts of fine black magnetic particles of 100–325 mesh. The particles were dispersed in the previously prepared white liquid to form a liquid dispersion. Measurement with a Brookfield viscometer by the direct method showed that the dispersion had a yield value of 6.3 dyne/cm$^2$.

A multicell plate 1.0 mm thick having cells formed as independent through holes with a square cross section of 4×4 mm was sandwiched between two plastic films each 0.1 mm thick and fixed with an adhesive. The previously prepared liquid dispersion was disposed in the cells to form the magnetic display panel. The adhesive was a mixture of Adeka Resin EP 4000 and Anchor-1170.

Tests were conducted to compare the performance of the magnetic panels prepared in Examples 1 to 19 and those of the magnetic panel prepared in Comparative Example. The factors observed, which are listed below in Table 3, were the sharpness of display, amount of adhesive dissolved into the dispersion, and the degree of variation in the yield value of the dispersion.

TABLE 3

| Example No. | Sharpness of display | Amount of adhesive dissolved into liquid dispersion | Variation in the yield value of liquid dispersion |
|---|---|---|---|
| 1 | sharp | small | small |
| 2 | " | " | " |
| 3 | " | " | " |
| 4 | " | " | " |
| 5 | " | " | " |
| 6 | " | " | " |
| 7 | " | large | " |
| 8 | " | " | " |
| 9 | " | " | " |
| 10 | " | " | " |
| 11 | " | " | " |
| 12 | " | " | " |
| 13 | " | " | " |
| 14 | " | " | " |
| Comparative Example | slightly blurred | " | large |
| 15 | sharp | " | small |
| 16 | " | " | " |
| 17 | " | " | " |
| 18 | " | " | " |
| 19 | " | " | " |

The tests were conducted as follows. First, the yield value of each liquid dispersion was measured and the liquid dispersion disposed in a test panel. Then, a magnet was used to produce a display on the panel and the sharpness of the display was examined visually. Subsequently, the dispersion was taken out of the panel and examined to determine if any adhesive used in constructing the panel had dissolved in the dispersion. The yield value of tha dispersion was compared with the value measured before confining it in the panel.

Measurement of the yield value was carried out by the direct method using a Brookfield BL viscometer (product of Tokyo Keiki K.K.). The method of measurement was as follows. The rotor of the viscometer was immersed in the liquid dispersion and only the dispersion was allowed to move around the rotor at a very slow rate of 0.2 rpm without rotating the rotor. The spring of the rotor was turned to cause both the rotor and the dispersion to turn. When the rotor had been turned through a certain angle, the dispersion began to slide along the rotor. The angle of torsion of the rotor at the time when such slippage occurred was measured. The yield value was calculated from the angle of torsion of the rotor, the torsion constant of the spring of the rotor, and the configuration and area of the rotor. The conversion formulae used were as follows.

| Rotor Number | Yield Value |
|---|---|
| No. 1 rotor | $0.168\theta$ |
| No. 2 rotor | $0.840\theta$ |
| No. 3 rotor | $3.360\theta$ |

In the formulae, $\theta$ is the measured angle of torsion of the rotor.

The test results show that the liquid dispersion confined in each of the panels of Examples 1 to 19 experienced only a small variation in the yield value. For example, the dispersion used in Examples 4 and 11, which has an initial yield value of 8.4 dyne/cm$^2$, still had a value of 5 dyne/cm$^2$ after it was disposed in a panel. On the other hand, the dispersion used in the Comparative Example had a yield value of less than 2 dyne/cm$^2$ after it was disposed in a panel. Accordingly, the liquid dispersion used in the Comparative Example did not have a yield value of 5 dyne/cm$^2$ or more that is essential to the invention and a magnetic display panel using such dispersion was not commercially acceptable.

In summary, the magnetic display panel of the invention produced by utilizing a liquid dispersion having a yield value of 5 dyne/cm$^2$ or more which has dispersed therein fine particles of an organic thickener achieved good results in each test and was concluded to be a very useful product.

What is claimed is:

1. A magnetic display panel comprising:
   a liquid containing panel having a front substrate formed of a material selected from the group consisting of transparent and translucent materials and a rear substrate disposed opposite to said substrate and bonded thereto by an adhesive comprising a polyester adhesive, a liquid sealing space being formed between said substrates; and
   a dispersing liquid having a yield value of at least 5 dyne/cm$^2$ sealed in said space, said dispersing liquid comprising, a fine particulate thickener selected from the group consisting of an olefinic polymer, olefinic copolymer, metal soap, fatty acid amide, wax and dextrin fatty acid ester; fine magnetic particles, a colorant and a dispersion medium, an image being recordable on said panel by a movable marking device having an oriented magnetic field.

2. The magnetic display panel according to claim 1 further comprising a multicell structure having a plurality of independent spaces disposed between said substrates and being bonded to the substrates by an adhesive.

3. The magnetic display panel according to claim 2 wherein said multicell structure comprises a plurality of honeycomb cores.

4. The magnetic display panel according to claim 1 or 2 wherein said fine magnetic particles comprise a material selected from the group consisting of black magnetite, gamma-hematite, chromium dioxide, ferrite, iron, cobalt and nickel including granulated particles thereof.

5. The magnetic display panel according to claim 1 or 2 wherein the movable marking device having an oriented magnetic field comprises one of a permanent magnet and an electromagnet.

6. A magnetic display panel comprising:
   a front substrate formed of a material selected from the group consisting of transparent and translucent materials and a rear substrate arranged opposite said front substrate, a liquid sealing space being formed between said substrates, said substrates being bonded together with an adhesive; and
   a liquid dispersion having a yield value of at least 5 dyne/cm$^2$ disposed in said liquid sealing space, said dispersion comprising fine magnetic particles, a colorant, a dispersion medium and an organic thickener comprising an olefinic polymer, display of an image being recordable on said panel by a movable marking device having an oriented magnetic field.

7. A magnetic display panel comprising:
   a front substrate formed of a material selected from the group consisting of transparent and translucent materials and a rear substrate arranged opposite said front substrate, a liquid sealing space being formed betweeen said substrates, said substrates being bonded together with an adhesive; and a liquid dispersion having a yield value of at least 5 dyne/cm² disposed in said liquid sealing space, said dispersion comprising fine magnetic particles, a colorant, a dispersion medium and an organic thickener comprising a copolymer of an olefin and a monomer copolymerizable therewith, display of an image being recordable on said panel by a movable marking device having an oriented magnetic field.

8. A magnetic display panel comprising:

a front substrate formed of a material selected from the group consisting of transparent and translucent materials and a rear substrate arranged opposite said front substrate, a liquid sealing space being formed between said substrates, said substrates being bonded together with an adhesive; and a liquid dispersion having a yield value of at least 5 dyne/cm² disposed in said liquid sealing space, said dispersion comprising fine magnetic particles, a colorant, a dispersion medium and an organic thickener comprising a fatty acid amide, display of an image being recordable on said panel by a movable marking device having an oriented magnetic field.

9. A magnetic display panel comprising:

a front substrate formed of a material selected from the group consisting of transparent and translucent materials and a rear substrate arranged opposite said front substrate, a liquid sealing space being formed between said substrates, said substrates being bonded together with an adhesive; and a liquid dispersion having a yield value of at least 5 dyne/cm² disposed in said liquid sealing space, said dispersion comprising fine magnetic particles, a colorant, a dispersion medium and an organic thickener comprising wax, display of an image being recordable on said panel by a movable marking device having an oriented magnetic field.

10. A magnetic display panel comprising:

a front substrate formed of a material selected from the group consisting of transparent and translucent materials and a rear substrate arranged opposite said front substrate, a liquid sealing space being formed between said substrates, said substrates being bonded together with an adhesive; and a liquid dispersion having a yield value of at least 5 dyne/cm² disposed in said liquid sealing space, said dispersion comprising fine magnetic particles, a colorant, a dispersion medium and an organic thickener comprising a dextrin fatty acid ester, display of an image being recordable on said panel by a movable marking device having an oriented magnetic field.

11. A magnetic display panel comprising:

a front substrate formed of a material selected from the group consisting of transparent and translucent materials and a rear substrate arranged opposite said front substrate, a liquid sealing space being formed between said substrates, said substrates being bonded together with an adhesive comprising a polyester adhesive; and a liquid dispersion having a yield value of at least 5 dyne/cm² disposed in said liquid sealing space, said dispersion comprising fine magnetic particles, a colorant, a dispersion medium and an organic thickener, display of an image recordable on said panel by a movable marking device having an oriented magnetic field.

12. A magnetic display panel comprising:

a front substrate formed of a material selected from the group consisting of transparent and translucent materials and a rear substrate arranged opposite said front substrate, a liquid sealing space being formed between said substrates, said substrates being bonded together with an adhesive comprising an acrylic resin adhesive; and a liquid dispersion having a yield value of at least 5 dyne/cm² disposed in said liquid sealing space, said dispersion comprising fine magnetic particles, a colorant, a dispersion medium and an organic thickener, display of an image being recordable on said panel by a movable marking device having an oriented magnetic field.

13. The magnetic display panel according to claim 11, 12 or 7 wherein said organic thickener comprises an olefinic polymer.

14. The magnetic display panel according to claim 11, 12 or 7 wherein said organic thickener comprises a copolymer of an olefin and a monomer copolymerizable therewtih.

15. The magnetic display panel according to claim 11, 12 or 7 wherein said organic thickener comprises metal soap.

16. The magnetic display panel according to claim 11, 12 or 7 wherein said organic thickener comprises a fatty acid amide.

17. The magnetic display panel according to claim 11, 12 or 7 wherein said organic thickener comprises wax.

18. The magnetic display panel according to claim 11, 12 or 7 wherein said organic thickener comprises a dextrin fatty acid ester.

19. The magnetic display panel according to claim 6, 7 or 8 wherein said adhesive comprises an epoxy resin adhesive.

20. The magnetic display panel according to claim 6, 7, 8, 9 or 10 wherein said adhesive comprises a polyurethane adhesive.

21. The magnetic display panel according to claim 6, 7, 8, 9 or 10 wherein said adhesive comprises a vinyl adhesive.

22. The magnetic display panel according to claim 6, 7, 8, 9 or 10 wherein said adhesive comprises a polyester adhesive.

23. The magnetic display panel according to claim 6, 7, 8, 9 or 10 wherein said adhesive comprises an acrylic resin adhesive.

24. The magnetic display panel according to claim 6, 7, 8, 9 or 10 wherein said adhesive comprises a synthetic rubber adhesive.

25. A magnetic display panel comprising:

a liquid containing panel having a front substrate formed of a material selected from the group consisting of transparent and translucent materials and a rear substrate disposed opposite to said substrate and bonded thereto by an adhesive comprising an acrylic resin adhesive, a liquid sealing space being formed between said substrates; and a dispersing liquid having a yield value of at least 5 dyne/cm² sealed in said space, said dispersing liquid comprising, a fine particulate thickener selected from the group consisting of an olefinic polymer, olefinic copolymer, metal soap, fatty acid amide, wax and dextrin fatty acid ester; fine magnetic particles, a colorant and a dispersion medium, an image being recordable on said panel by a movable marking device having an oriented magnetic field.

26. The magnetic display panel according to claim 25 further comprising a multicell structure having a plurality of independent spaces disposed between said substrates and being bonded to the substrates by an adhesive.

27. The magnetic display panel according to claim 26 wherein said multicell structure comprises a plurality of honeycomb cores.

28. The magnetic display panel according to claim 25 or 26 wherein said fine magnetic particles comprise a material selected from the group consisting of black magnetite, gamma-hematite, chromium dioxide, ferrite, iron, cobalt and nickel including granulated particles thereof.

29. The magnetic display panel according to claim 25 or 26 wherein the movable marking device having an oriented magnetic field comprises one of a permanent magnet and an electromagnet.

30. A magnetic display panel comprising:
a liquid containing panel having a front substrate formed of a material selected from the group consisting of transparent and translucent materials and a rear substrate disposed opposite to said substrate and bonded thereto by an adhesive comprising a synthetic rubber adhesive, a liquid sealing space being formed between said substrates; and
a dispersing liquid having a yield value of at least 5 dyne/cm$^2$ sealed in said space, said dispersing liquid comprising, a fine particulate thickener selected from the group consisting of an olefinic polymer, olefinic copolymer, metal soap, fatty acid amide, wax and dextrin fatty acid ester; fine magnetic particles, a colorant and a dispersion medium, an image being recordable on said panel by a movable marking device having an oriented magnetic field.

31. The magnetic display panel according to claim 30 further comprising a multicell structure having a plurality of independent spaces disposed between said substrates and being bonded to the substrates by an adhesive.

32. The magnetic display panel according to claim 31 wherein said multicell structure comprises a plurality of honeycomb cores.

33. The magnetic display panel according to claim 30 or 31 wherein said fine magnetic particles comprise a material selected from the group consisting of black magnetite, gamma-hematite, chromium dioxide, ferrite, iron, cobalt and nickel including granulated particles thereof.

34. The magnetic display panel according to claim 30 or 31 wherein the movable marking device having an oriented magnetic field comprises one of a permanent magnet and an electromagnet.

35. A magnetic display panel comprising:
a front substrate formed of a material selected from the group consisting of transparent and translucent materials and a rear substrate arranged opposite said front substrate, a liquid sealing space being formed between said substrates, said substrates being bonded together with an adhesive comprising a synthetic rubber adhesive; and
a liquid dispersion having a yield value of at least 5 dyne/cm$^2$ disposed in said liquid sealing space, said dispersion comprising fine magnetic particles, a colorant, a dispersion medium and an organic thickener, display of an image recordable on said panel by a movable marking device having an oriented magnetic field.

* * * * *